(12) United States Patent
Otero Martinez

(10) Patent No.: US 10,316,160 B2
(45) Date of Patent: Jun. 11, 2019

(54) POLYURETHANES WITH REDUCED ALDEHYDE EMISSION

(71) Applicant: BASF SE, Ludwigshafen (DE)

(72) Inventor: Iran Otero Martinez, Stemwede (DE)

(73) Assignee: BASF SE, Ludwigshafen (DE)

( * ) Notice: Subject to any disclaimer, the term of this patent is extended or adjusted under 35 U.S.C. 154(b) by 85 days.

(21) Appl. No.: 15/101,183

(22) PCT Filed: Nov. 24, 2014

(86) PCT No.: PCT/EP2014/075387
§ 371 (c)(1),
(2) Date: Jun. 2, 2016

(87) PCT Pub. No.: WO2015/082242
PCT Pub. Date: Jun. 11, 2015

(65) Prior Publication Data
US 2016/0304687 A1 Oct. 20, 2016

(30) Foreign Application Priority Data
Dec. 2, 2013 (EP) ..................... 13195356

(51) Int. Cl.
| C08J 9/00 | (2006.01) |
| C08K 5/42 | (2006.01) |
| C08G 18/08 | (2006.01) |
| C08G 18/28 | (2006.01) |
| C08G 18/32 | (2006.01) |
| C08G 18/48 | (2006.01) |
| C08G 18/50 | (2006.01) |
| C08G 18/66 | (2006.01) |
| C08G 18/72 | (2006.01) |

(Continued)

(52) U.S. Cl.
CPC ............ *C08J 9/0033* (2013.01); *C08G 18/14* (2013.01); *C08G 18/288* (2013.01); *C08G 18/3281* (2013.01); *C08G 18/482* (2013.01); *C08G 18/4845* (2013.01); *C08G 18/5024* (2013.01); *C08G 18/6688* (2013.01); *C08G 18/725* (2013.01); *C08G 18/7664* (2013.01); *C08G 18/797* (2013.01); *C08K 5/42* (2013.01); *C08G 2101/0066* (2013.01); *C08G 2101/0083* (2013.01); *C08J 2207/06* (2013.01); *C08J 2375/08* (2013.01)

(58) Field of Classification Search
CPC .. C08J 9/0033; C08J 2207/06; C08J 2375/08; C08G 18/14; C08G 18/4845; C08G 18/482; C08G 18/7664; C08G 18/725; C08G 18/797; C08G 18/288; C08G 18/5024; C08G 18/3281; C08G 18/6688; C08G 2101/0066; C08G 2101/0083; C08K 5/42
See application file for complete search history.

(56) References Cited

U.S. PATENT DOCUMENTS

| 3,304,273 A | 2/1967 | Stamberger |
| 3,383,351 A | 5/1968 | Stamberger |

(Continued)

FOREIGN PATENT DOCUMENTS

| DE | 111 394 | 7/1900 |
| DE | 1 152 536 B | 8/1963 |

(Continued)

OTHER PUBLICATIONS

International Search Report dated Jan. 28, 2015 in PCT/EP2014/075387.

(Continued)

*Primary Examiner* — Rabon A Sergent
(74) *Attorney, Agent, or Firm* — Oblon, McClelland, Maier & Neustadt, L.L.P.

(57) ABSTRACT

The present invention relates to a process for the production of polyurethanes where (a) polyisocyanate, (b) polymeric compounds having groups reactive toward isocyanates, (c) catalysts, (d) sulfur-carbon compounds selected from the group consisting of sulfinic acid derivatives of the general formula (I)

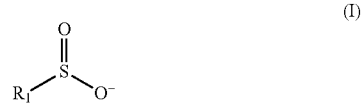

and/or sulfonic acid derivatives according to the general formula (II)

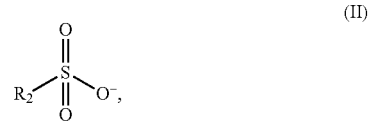

where $R_1$ and $R_2$ can be identical or different and are respectively any desired substituted or unsubstituted hydrocarbon moiety, with the proviso that the carbon atom bonded to the sulfur atom is an aliphatic carbon atom, and optionally (e) blowing agent, (f) chain extender and/or crosslinking agent, and (g) auxiliaries and/or additives are mixed to give a reaction mixture, and the reaction mixture is allowed to complete a reaction to give the polyurethane. The present invention further relates to polyurethanes produced by this process and to the use of these polyurethanes in the interior of means of transport.

14 Claims, No Drawings

(51) Int. Cl.
  *C08G 18/76* (2006.01)
  *C08G 18/79* (2006.01)
  *C08L 75/08* (2006.01)
  *C08G 101/00* (2006.01)

(56) References Cited

U.S. PATENT DOCUMENTS

| | | | |
|---|---|---|---|
| 3,523,093 A | | 8/1970 | Stamberger |
| 4,758,601 A | * | 7/1988 | Haas .................. C08G 18/0819 521/108 |
| 5,506,275 A | | 4/1996 | Valoppi |
| 2008/0004362 A1 | * | 1/2008 | Masuda ................ C07C 217/08 521/184 |
| 2008/0275155 A1 | * | 11/2008 | Wagner .............. C08G 18/0828 522/174 |
| 2008/0281013 A1 | | 11/2008 | Nakamura et al. |

FOREIGN PATENT DOCUMENTS

| | | |
|---|---|---|
| DE | 1 152 537 B | 8/1963 |
| DE | 26 15 804 A1 | 10/1977 |
| DE | 101 16 757 A1 | 10/2002 |
| EP | 0 090 444 A2 | 10/1983 |
| EP | 0 364 854 A2 | 4/1990 |
| EP | 0 897 402 | 2/1999 |
| EP | 0 989 146 A1 | 3/2000 |
| EP | 1 428 847 A1 | 6/2004 |
| EP | 1 460 094 A1 | 9/2004 |
| EP | 1 529 792 A1 | 5/2005 |
| EP | 1 888 664 | 2/2008 |
| JP | 2005-154599 A | 6/2005 |
| WO | WO 2005/090440 A1 | 9/2005 |
| WO | WO 2006/034800 A1 | 4/2006 |
| WO | WO 2006/042674 A1 | 4/2006 |
| WO | WO 2008/055952 A1 | 5/2008 |
| WO | WO 2009/128279 A1 | 10/2009 |

OTHER PUBLICATIONS

International Preliminary Report on Patentability and Written Opinion of the International Searching Authority dated Jun. 7, 2016 in PCT/EP2014/075387 filed Nov. 24, 2014 (with English translation).
International Search Report and Written Opinion dated Jan. 28, 2015 in PCT/EP2014/075387 (with English translation of Categories of Cited Documents).
"Polyurethane Kunststoff Handbuch" Carl Hanser Verlag, 3 neu bearbeitete Auflage, vol. 7, Chapter 3.1, 1993, 21 Pages.
"Polyurethane Kunststoff Handbuch" Carl Hanser Verlag, 3 neu bearbeitete Auflage, vol. 7, Chapter 3.2 and 3.3.2, 1993, 26 Pages.
"Polyurethane Kunststoff Handbuch" Carl Hanser Verlag, 3 neu bearbeitete Auflage, vol. 7, Chapter 3.4.5, 1993, 6 Pages.
"Polyurethane Kunststoff Handbuch" Carl Hanser Verlag, 3 neu bearbeitete Auflage, vol. 7, Chapter 3.4.6 to 3.4.11, 1993, 9 Pages.
"Polyurethane Kunststoff Handbuch" Carl Hanser Verlag, 3 neu bearbeitete Auflage, vol. 7, Chapter 3.4.4, 1993, 5 Pages.
"Polyurethane Kunststoff Handbuch" Carl Hanser Verlag, 3 neu bearbeitete Auflage, vol. 7, Chapter 5, 1993, 75 Pages.
"Polyurethane Kunststoff Handbuch" Carl Hanser Verlag, 3 neu bearbeitete Auflage, vol. 7, Chapter 6, 1993, 90 Pages.
"Polyurethane Kunststoff Handbuch" Carl Hanser Verlag, 3 neu bearbeitete Auflage, vol. 7, Chapter 7, 1993, 64 Pages.

\* cited by examiner

POLYURETHANES WITH REDUCED ALDEHYDE EMISSION

The present invention relates to the production of polyurethanes where (a) polyisocyanate, (b) polymeric compounds having groups reactive toward isocyanates, (c) catalysts, (d) sulfur-carbon compounds comprising one or more anions selected from the group consisting of sulfinic acid derivatives of the general formula (I)

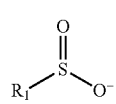
(I)

and/or sulfonic acid derivatives according to the general formula (II)

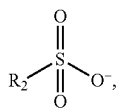
(II)

where $R_1$ and $R_2$ can be identical or different and are respectively any desired substituted or unsubstituted hydrocarbon moiety, with the proviso that the carbon atom bonded to the sulfur atom is an aliphatic carbon atom, and optionally (e) blowing agent, (f) chain extender and/or crosslinking agent, and (g) auxiliaries and/or additives are mixed to give a reaction mixture, and the reaction mixture is allowed to complete a reaction to give the polyurethane. The present invention further relates to polyurethanes produced by this process and to the use of these polyurethanes in the interior of means of transport.

Polyurethanes are versatile, being used by way of example as seat cushioning in the furniture industry and as binders for particleboard, as insulation material in the construction industry, as insulation material by way of example for pipes, hot-water tanks, and refrigerators, and as cladding components, for example in vehicle construction. In particular, polyurethanes are frequently used in automobile construction, for example in the external cladding of automobiles as spoilers, roof elements, and springing elements, and also in the interior cladding of automobiles as roof cladding, carpet-backing foam, door cladding, steering rings, control knobs, and seat cushioning.

In this context it is known that polyurethanes tend to emit organic substances which can cause unpleasant odors or, in the event of high concentration, can cause health-related problems. Enclosed spaces are in particular affected here, for example in the interiors of buildings or of vehicles such as automobiles. An example of these emissions is emission of aldehydes. Various attempts have already been made to reduce these aldehyde emissions: by way of example EP 1428847 says that aldehyde emissions can be reduced by adding polymeric substances having primary and/or secondary amino groups.

JP 2005-154599 describes the reduction of aldehyde emissions in polyurethane foams resulting from the addition of 0.001 to 0.01% by weight of a reducing agent selected from sodium borohydride, aluminum lithium hydride, sodium thiosulfate, sodium sulfite, hydrazine compounds, ascorbic acid, and reducing sugar. According to JP 2005-154599, however, aldehyde emission in foams still requires improvement.

US 2008/0281013 describes the use of sulfites and/or disulfites in a range from 0.02 to 2% by weight for the reduction of aldehyde emissions.

It was an object of the present invention to provide an improved process for the reduction of aldehyde emissions in polyurethanes, in particular polyurethane foams. The intention here is in particular to use substances which are inexpensive and easy to handle, and which do not impair the production of the polyurethanes.

Surprisingly, the object of the invention has been achieved via a process for the production of polyurethanes where (a) polyisocyanate, (b) polymeric compounds having groups reactive toward isocyanates, (c) catalysts, (d) sulfur-carbon compounds comprising one or more anions selected from the group consisting of sulfinic acid derivatives of the general formula (I)

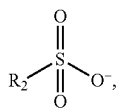
(I)

and/or sulfonic acid derivatives according to the general formula (II)

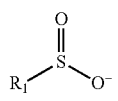
(II)

where $R_1$ and $R_2$ can be identical or different and are respectively any desired substituted or unsubstituted hydrocarbon moiety, with the proviso that the carbon atom bonded to the sulfur atom is an aliphatic carbon atom, and optionally (e) blowing agent, (f) chain extender and/or crosslinking agent, and (g) auxiliaries and/or additives are mixed to give a reaction mixture, and the reaction mixture is allowed to complete a reaction to give the polyurethane.

For the purposes of the invention, the term polyurethane comprises all of the known polyisocyanate polyaddition products. These comprise adducts of isocyanate and alcohol, and also comprise modified polyurethanes which can comprise isocyanurate structures, allophanate structures, urea structures, carbodiimide structures, uretonimine structures, biuret structures, and other isocyanate adducts. In particular, these polyurethanes of the invention comprise compact polyisocyanate polyaddition products, for example thermosets, and foams based on polyisocyanate polyaddition products, for example flexible foams, semirigid foams, rigid foams, and integral foams, and also polyurethane coatings and binders. For the purposes of the invention, the term polyurethanes moreover includes polymer blends comprising polyurethanes and other polymers, and also foams made of said polymer blends. It is preferable that the polyurethanes of the invention are polyurethane foams or compact polyurethanes which comprise no polymers other than the polyurethane units (a) to (g) explained hereinafter.

For the purposes of the invention, the term polyurethane foams use foams in accordance with DIN 7726. The compressive stress value for 10% compression, or compressive strength in accordance with DIN 53 421/DIN EN ISO 604 of flexible polyurethane foams of the invention here is 15 kPa or less, preferably from 1 to 14 kPa, and in particular from 4 to 14 kPa. The compressive stress value for 10% compression in accordance with DIN 53 421/DIN EN ISO 604 of semirigid polyurethane foams of the invention is from more than 15 kPa to less than 80 kPa. The open-cell factor of semirigid polyurethane foams and flexible polyurethane foams of the invention in accordance with DIN ISO 4590 is preferably greater than 85%, particularly preferably greater than 90%. Further details relating to flexible polyurethane foams and semirigid polyurethane foams of the invention can be found in "Kunststoffhandbuch [Plastics handbook], volume 7, Polyurethane [Polyurethanes]", Carl Hanser Verlag, 3$^{rd}$ edition 1993, chapter 5.

The compressive stress value for 10% compression of rigid polyurethane foams of the invention is greater than or equal to 80 kPa, preferably greater than or equal to 120 kPa, particularly preferably greater than or equal to 150 kPa. The closed-cell factor of the rigid polyurethane foam in accordance with DIN ISO 4590 is moreover more than 80%, preferably more than 90%.

Further details relating to rigid polyurethane foams of the invention can be found in "Kunststoffhandbuch [Plastics handbook], volume 7, Polyurethane [Polyurethanes]", Carl Hanser Verlag, 3$^{rd}$ edition 1993, chapter 6.

For the purposes of this invention, the term elastomeric polyurethane foams means polyurethane foams in accordance with DIN 7726 which after brief deformation by 50% of thickness in accordance with DIN 53 577 after 10 minutes exhibit no residual deformation exceeding 2% of their initial thickness. This can apply to a rigid polyurethane foam, a semirigid polyurethane foam, or a flexible polyurethane foam.

Integral polyurethane foams are polyurethane foams in accordance with DIN 7726 with a marginal zone which, as a result of the shaping process, has higher density than the core. The overall apparent density averaged over the core and the marginal zone here is preferably above 100 g/L. Again, integral polyurethane foams for the purposes of the invention can be rigid polyurethane foams, semirigid polyurethane foams, or flexible polyurethane foams. Further details relating to integral polyurethane foams of the invention can be found in "Kunststoffhandbuch [Plastics handbook], volume 7, Polyurethane [Polyurethanes]", Carl Hanser Verlag, 3$^{rd}$ edition 1993, chapter 7.

The polyurethanes of the invention are obtained here in that polyisocyanates (a) are mixed with polymeric compounds (b) having groups reactive toward isocyanates, optionally catalysts (c), sulfur-carbon compounds (d), and optionally blowing agent (e), chain extender (f), and other auxiliaries and additives (g) to give a reaction mixture, and allowing completion of a reaction.

In a preferred embodiment, the polyurethane of the invention here is a polyurethane foam with an average density of 20 to 850 g/L, preferably a semirigid polyurethane foam, or a flexible polyurethane foam, or a rigid polyurethane foam, particularly preferably an elastomeric flexible polyurethane foam, a semirigid polyurethane foam, or an elastomeric integral polyurethane foam. It is preferable that the density of the elastomeric integral polyurethane foam averaged over the core and the marginal zone is from 150 to 500 g/L. It is preferable that the average density of the flexible polyurethane foam is from 10 to 100 g/L. It is preferable that the average density of the semirigid polyurethane foam is from 70 to 150 g/L.

In another preferred embodiment, the polyurethane is a compact polyurethane with a density that is preferably more than 850 g/L, preferably from 900 to 1400 g/L, and particularly preferably from 1000 to 1300 g/L. A compact polyurethane is obtained here in essence without addition of a blowing agent. Small quantities of blowing agent, for example water, comprised in the polyols as a result of a production process are not counted as blowing agent here. It is preferable that the reaction mixture for the production of the compact polyurethane comprises less than 0.2% by weight of water, particularly less than 0.1% by weight, and in particular less than 0.05% by weight.

The polyurethane of the invention is preferably used here in the interior of means of transport, for example ships, aircraft, trucks, cars, or buses, particularly cars or buses, and in particular cars. The term automobile interior is used hereinafter for the interior of cars and buses. It is possible here to use a flexible polyurethane foam as seat cushion, a semirigid polyurethane foam as foam backing of door side elements or of instrument panels, an integral polyurethane foam as steering wheel, control knob, or headrest, and a compact polyurethane by way of example as cable-sheathing.

The polyisocyanate components (a) used for the production of the polyurethanes of the invention comprise any of the polyisocyanates known for the production of polyurethanes. These comprise the aliphatic, cycloaliphatic, and aromatic difunctional or polyfunctional isocyanates known from the prior art, and also any desired mixtures thereof. Examples are diphenylmethane 2,2'-, 2,4'-, and 4,4'-diisocyanate, the mixtures of monomeric diphenylmethane diisocyanates with diphenylmethane diisocyanate homologs having a larger number of rings (polymer MDI), isophorone diisocyanate (IPDI) and its oligomers, tolylene 2,4- and 2,6-diisocyanate (TDI), and mixtures of these, tetramethylene diisocyanate and its oligomers, hexamethylene diisocyanate (HDI) and its oligomers, naphthylene diisocyanate (NDI), and mixtures thereof.

It is preferably to use tolylene 2,4- and/or 2,6-diisocynate (TDI) or a mixture thereof, monomeric diphenylmethane diisocyanates, and/or diphenylmethane diisocyanate homologs having a larger number of rings (polymer MDI), and mixtures of these. Other possible isocyanates are mentioned by way of example in "Kunststoffhandbuch [Plastics handbook], volume 7, Polyurethane [Polyurethanes]", Carl Hanser Verlag, 3$^{rd}$ edition 1993, chapter 3.2 and 3.3.2.

Polyisocyanate component (a) used can take the form of polyisocyanate prepolymers. These polyisocyanates prepolymers are obtainable by reacting the polyisocyanates described above (constituent (a-1)) in excess, for example at temperatures of from 30 to 100° C., preferably at about 80° C., with polymeric compounds (b) (constituent (a-2)), having groups reactive toward isocyanates, and/or with chain extenders (c) (constituent (a-3)) to give the isocyanate prepolymer.

Polymeric compounds (a-2) having groups reactive toward isocyanates, and chain extenders (a-3), are known to the person skilled in the art and are described by way of example in "Kunststoffhandbuch [Plastics handbook], volume 7, Polyurethane [Polyurethanes]", Carl Hanser Verlag, 3$^{rd}$ edition 1993, chapter 3.1: by way of example, it is also possible to use, as polymeric compounds (a-2) having groups reactive toward isocyanates, the polymeric compounds described under (b) having groups reactive toward isocyanates.

It is possible to use, as polymeric compounds (b) having groups reactive toward isocyanates, any of the known compounds having at least two hydrogen atoms reactive toward isocyanates, for example those with functionality from 2 to 8 and with number-average molar mass from 400 to 15 000 g/mol: by way of example it is possible to use compounds selected from the group of the polyether polyols, polyester polyols, and mixtures thereof.

Polyetherols are by way of example produced from epoxides, for example propylene oxide and/or ethylene oxide, or from tetrahydrofuran with starter compounds exhibiting hydrogen-activity, for example aliphatic alcohols, phenols, amines, carboxylic acids, water, or compounds based on natural substances, for example sucrose, sorbitol or mannitol, with use of a catalyst. Mention may be made here of basic catalysts and double-metal cyanide catalysts, as described by way of example in PCT/EP2005/010124, EP 90444, or WO 05/090440.

Polyesterols are by way of example produced from aliphatic or aromatic dicarboxylic acids and polyhydric alcohols, polythioether polyols, polyesteramides, hydroxylated polyacetals, and/or hydroxylated aliphatic polycarbonates, preferably in the presence of an esterification catalyst. Other possible polyols are mentioned by way of example in "Kunststoffhandbuch [Plastics handbook], volume 7, Polyurethane [Polyurethanes]", Carl Hanser Verlag, $3^{rd}$ edition 1993, chapter 3.1.

Other materials that can be used, alongside the polyetherols and polyesterols described, are polyetherols or polyesterols which are also termed polymer polyetherols or polymer polyesterols and which comprise fillers. These compounds preferably comprise dispersed particles made of thermoplastics, for example composed of olefinic monomers such as acrylonitrile, styrene, (meth)acrylates, (meth)acrylic acid, and/or acrylamide. These polyols comprising fillers are known and are obtainable commercially. A production process for these is described by way of example in DE 111 394, U.S. Pat. Nos. 3,304,273, 3,383,351, 3,523,093, DE 1 152 536, DE 1 152 537 WO 2008/055952, and WO 2009/128279.

In a particularly preferred embodiment of the present invention, component (b) comprises polyetherols, and more preferably comprises no polyesterols.

Catalysts (c) greatly accelerate the reaction of the polyols (b) and optionally chain extender and crosslinking agent (f), and also chemical blowing agent (e) with the organic, optionally modified polyisocyanates (a). The catalysts (c) here comprise incorporable amine catalysts. These have at least one, preferably from 1 to 8, and particularly preferably from 1 to 2, groups reactive toward isocyanates, for example primary amine groups, secondary amine groups, hydroxy groups, amides, or urea groups, preferably primary amine groups, secondary amine groups, or hydroxy groups. Incorporable amine catalysts are used mostly for the production of low-emission polyurethanes which are in particular used in the automobile-interior sector. These catalysts are known and are described by way of example in EP1888664. These comprise compounds which preferably comprise, alongside the group(s) reactive toward isocyanates, one or more tertiary amino groups. It is preferable that at least one tertiary amino groups of the incorporable catalysts bears at least two aliphatic hydrocarbon moieties, preferably having from 1 to 10 carbon atoms per moiety, particularly preferably having from 1 to 6 carbon atoms per moiety. It is particularly preferable that the tertiary amino groups bear two moieties selected mutually independently from methyl and ethyl moiety, and also bear another organic moiety. Examples of incorporable catalysts that can be used are bisdimethylaminopropylurea, bis(N,N-dimethylaminoethoxyethyl) carbamate, dimethylaminopropylurea, N,N,N-trimethyl-N-hydroxyethylbis(aminopropyl ether), N,N,N-trimethyl-N-hydroxyethylbis(aminoethyl ether), diethylethanolamine, bis(N,N-dimethyl-3-aminopropyl)amine, dimethylaminopropylamine, 3-dimethyaminopropyl-N,N-dimethylpropane-1,3-diamine, dimethyl-2-(2-aminoethoxyethanol), and (1,3-bis(dimethylamino)propan-2-ol), N,N-bis(3-dimethylaminopropyl)-N-isopropanolamine, bis(dimethylaminopropyl)-2-hydroxyethylamine, N,N,N-trimethyl-N-(3 aminopropyl)bis(aminoethyl ether), 3-dimethylaminoisopropyldiisopropanolamine, and mixtures thereof.

It is also possible to use conventional catalysts, alongside the incorporable amine catalysts, to produce the polyurethanes. Mention may be made by way of example of amidines, such as 2,3-dimethyl-3,4,5,6-tetrahydropyrimidine, tertiary amines, such as triethylamine, tributylamine, dimethylbenzylamine, N-methyl-, N-ethyl-, and N-cyclohexylmorpholine, N,N,N',N'-tetramethylethylenediamine, N,N,N',N'-tetramethylbutanediamine, N,N,N',N'-tetramethylhexanediamine, pentamethyldiethylenetriamine, tetramethyldiaminoethyl ether, bis(dimethylaminopropyl)urea, dimethylpiperazine, 1,2-dimethylimidazole, 1-azabicyclo[3.3.0]octane, and preferably 1,4-diazabicyclo[2.2.2]octane, and alkanolamine compounds, such as triethanolamine, triisopropanolamine, N-methyl- and N-ethyldiethanolamine, and dimethylethanolamine. It is also possible to use organometallic compounds, preferably organotin compounds, such as tin(II) salts of organic carboxylic acids, e.g. tin(II) acetate, tin(II) octoate, tin(II) ethylhexoate, and tin(II) laurate, and the dialkyltin(IV) salts of organic carboxylic acids, e.g. dibutyltin diacetate, dibutyltin dilaurate, dibutyltin maleate, and dioctyltin diacetate, and also bismuth carboxylates, such as bismuth(III) neodecanoate, bismuth 2-ethylhexanoate, and bismuth octanoate, or a mixture thereof. The organometallic compounds can be used alone or preferably in combination with strongly basic amines. If component (b) involves an ester, it is preferable to use exclusively amine catalysts. In a particularly preferred embodiment, catalysts (c) used comprise exclusively incorporable catalysts.

If catalysts (c) are used, these can by way of example be used at a concentration of from 0.001 to 5% by weight, in particular from 0.05 to 2% by weight, as catalyst or, respectively, catalyst combination, based on the weight of component (b).

The sulfur-carbon compounds (d) comprise one or more anions selected from the group consisting of sulfinic acid derivatives of the general formula (I)

and/or sulfonic acid derivatives of the general formula (II)

Each of the compounds here can be used individually or in the form of mixture. Any desired metal ions can serve as counterions, examples being metal ions selected from the group consisting of alkali metal ions, alkaline earth metal ions, and transition metal ions. It is preferable that the counterions are alkali metal ions, for example sodium or potassium ions. The moieties $R_1$ and $R_2$ can be identical or different, and each is any desired substituted or unsubstituted hydrocarbon moiety. It is essential to the invention here that the moiety $R_{1/2}$ has bonding to the sulfur atom by way of a carbon-sulfur bond where the carbon atom is an aliphatic carbon atom. For the purposes of the present invention aliphatic carbon atoms are carbon atoms which do not belong to any aromatic system. The aliphatic carbon atom bonded to the sulfur atom is preferably sp³-hybridized.

In a particularly preferred embodiment, the moieties $R_1$ and/or $R_2$ comprise from 1 to 15 carbon atoms, preferably from 2 to 10 carbon atoms, and particularly preferably 2 to 6 carbon atoms. The moieties $R_1$ and/or $R_2$ can moreover bear substituted or unsubstituted aromatic groups and/or functional groups, for example carboxylic acid groups or derivatives of carboxylic acid groups. Derivatives of carboxylic acid groups here for the purposes of the present invention are preferably esters, for example aliphatic esters, or salts, for example alkaline metal salts, preferably sodium salts, of the carboxylic acid groups. Examples of other possible functional groups are primary, secondary, and/or tertiary amine groups and hydroxy groups. In a particularly preferred embodiment, the moieties $R_1$ and/or $R_2$ comprise one or more groups reactive toward isocyanate, preferably OH, NH, or $NH_2$ groups. In particular, the moieties $R_1$ and/or $R_2$ comprise a group reactive toward isocyanates, preferably an OH group. Particular preference is given to disodium 2-hydroxy-2-sulfinatoacetate, sodium 2-hydroxyethanesulfonate, sodium 2-hydroxyphenylhydroxymethylsulfinate, sodium 4-methoxyphenylhydroxymethylsulfinate, zinc 2-hydroxy-2-sulfinatoacetate, disodium 2-hydroxy-2-sulfinatopropionate, and the ethyl ester of sodium 2-hydroxy-2-sulfinatopropionate.

Quantities of component (d) used for the purposes of the present invention are preferably from 0.01 to 2% by weight, particularly preferably from 0.02 to 1% by weight, and in particular from 0.05 to 0.2% by weight, based on the total weight of component (a) to (f).

If the intention is that the polyurethane of the invention take the form of polyurethane foam, reaction mixtures of the invention also comprise blowing agent (e). It is possible here to use any of the blowing agents known for the production of polyurethanes. These can comprise chemical and/or physical blowing agents. These blowing agents are described by way of example in "Kunststoffhandbuch [Plastics handbook], volume 7, Polyurethane [Polyurethanes]", Carl Hanser Verlag, 3$^{rd}$ edition 1993, chapter 3.4.5. The term chemical blowing agent here means compounds which form gaseous products through reaction with isocyanate. Examples of these blowing agents are water and carboxylic acids. The term physical blowing agents means compounds which have been dissolved or emulsified in the starting materials for the polyurethane production reaction and evaporate under the conditions of formation of polyurethane. These are by way of example hydrocarbons, halogenated hydrocarbons, and other compounds, examples being perfluorinated alkanes such as perfluorohexane, chlorofluorocarbons, and ethers, esters, ketones, acetals, and/or liquid carbon dioxide. Any desired quantity of the blowing agent can be used here. The quantity used of the blowing agent is preferably such that the density of the resultant polyurethane foam is from 10 to 850 g/L, particularly from 20 to 800 g/L, and in particular from 25 to 500 g/L. It is particularly preferable to use blowing agents comprising water.

Chain extenders and crosslinking agents (f) used here can be compounds of molar mass less than 400 g/mol which have at least two groups reactive toward isocyanates, the term chain extenders being used here for molecules having two hydrogen atoms reactive toward isocyanate, and the term crosslinking agent being used here for molecules having more than two hydrogens reactive toward isocyanate. However, it is also possible here to omit the chain extenders or crosslinking agents. Addition of chain extenders, crosslinking agents, or else optionally a mixture thereof can, however, proove to be advantageous for modification of mechanical properties, e.g. hardness.

If chain extenders and/or crosslinking agents (f) are used, use may be made of the chain extenders and/or crosslinking agents known in the production of polyurethanes. These are preferably low-molecular-weight compounds having functional groups reactive toward isocyanates, for example glycerol, trimethylolpropane, glycol, and diamines. Other possible low-molecular-weight chain extenders and/or crosslinking agents are mentioned by way of example in "Kunststoffhandbuch [Plastics handbook], volume 7, Polyurethane [Polyurethanes]", Carl Hanser Verlag, 3$^{rd}$ edition 1993, chapter 3.2 and 3.3.2.

It is moreover possible to use auxiliaries and/or additives (g). It is possible here to use any of the auxiliaries and additives known for the production of polyurethanes. Mention may be made by way of example of surface-active substances, foam stabilizers, cell regulators, release agents, fillers, dyes, pigments, flame retardants, hydrolysis stabilizers, fungistatic substances, and bacteriostatic substances. These substances are known and are described by way of example in "Kunststoffhandbuch [Plastics handbook], volume 7, Polyurethane [Polyurethanes]", Carl Hanser Verlag, 3$^{rd}$ edition 1993, chapter 3.4.4 and 3.4.6 to 3.4.11.

The quantities of the polyisocyanates (a), the polyols (b), the sulfur-carbon compounds (d) and, if used, the blowing agents (e) and chain extenders, and/or crosslinking agents (f) used in the production of the polyurethane of the invention are generally such that the equivalence ratio of NCO groups of the polyisocyanates (a) to the total number of the reactive hydrogen atoms of components (b), (c), (d), and optionally (e), and (f) is from 0.75 to 1.5:1, preferably from 0.80 to 1.25:1. If the cellular plastics comprise at least some isocyanurate groups, the ratio of NCO groups of the polisocyanates (a) to the total number of the reactive hydrogen atoms of component (b), (c), (d), and optionally (e) and (f) is usually from 1.5 to 20:1, preferably from 1.5 to 8:1. A ratio of 1:1 here corresponds to an isocyanate index of 100.

The quantitative and qualitative differences between the respective starting materials (a) to (g) for the production of polyurethanes of the invention in the form of thermoplastic polyurethane, flexible foam, semirigid foam, rigid foam, or integral foam are only small: by way of example, the production of compact polyurethanes uses no blowing agents, and thermoplastic polyurethane uses preferably strictly difunctional starting materials. It is moreover possible by way of example to vary the resilience and hardness of the polyurethane of the invention by way of the functionality and the chain length of the relatively high-molecular-weight compound having at least two reactive hydrogen atoms. These modifications are known to the person skilled in the art.

The starting materials for the production of a compact polyurethane are described by way of example in EP 0989146 or EP 1460094, the starting materials for the production of a flexible foam are described by way of example in PCT/EP2005/010124 and EP 1529792, the starting materials for the production of a semirigid foam are described by way of example in "Kunststoffhandbuch [Plastics handbook], volume 7, Polyurethane [Polyurethanes]", Carl Hanser Verlag, 3$^{rd}$ edition 1993, chapter 5.4, the starting materials for the production of a rigid foam are described in PCT/EP2005/010955, and the starting materials for production of an integral foam are described in EP 364854, U.S. Pat. No. 5,506,275, or EP 897402. The sulfur-carbon compound (d) is then in each case also added to the starting materials described in said document.

Polyurethanes are often produced by the two-component process. For this, an isocyanate component comprising component (a) and a polyol component comprising components (b), (c), (d) and, if desired, (e), (f), and (g) is mixed to produce the polyurethanes. This two-component process is relatively simple to operate. A great advantage of component (d) of the invention is that this is soluble in the polyol component: it is possible by way of example to add component (d) directly into the polyol component or to dissolve this in water and then combine with the other components to give the polyol component.

The invention provides not only the process of the invention but also a polyurethane obtainable by a process of the invention. The polyurethanes of the invention feature low emissions and therefore also low odor emission. In particular, polyurethanes of the invention feature low formaldehyde emission. Polyurethanes of the invention are therefore preferably used in enclosed spaces, for example as thermal insulation materials in residential buildings, for example insulation for pipes and refrigerators, in furniture construction, for example as decorative elements or as seat cushioning, and also in automobile interiors, for example as steering wheels, dashboards, door cladding, carpet-backing foam, acoustic foams, for example roof linings, and also headrests, seating foams, or control buttons. Preference is in particular given here to sulfur-carbon compounds having one or more groups reactive toward isocyanates. These permit linking of the sulfur-carbon compound (d) to the polyurethane skeleton, giving firstly a longer period of effectiveness, specifically a longer period of aldehyde reduction, under demanding conditions, for example high temperatures or insolation, than in the absence of the groups reactive toward isocyanate. Secondly, sulfur-carbon compounds (d) having incorporable groups give polyurethanes which exhibit not only low emission of aldehydes but also in general terms lower emissions of volatile organic compounds.

The invention will be illustrated below with reference to examples.

Starting materials:
Polyol A: Polyetherol with OH number 28 mg KOH/g and functionality 2.7 based on ethylene oxide and propylene oxide, with propylene oxide content 84% by weight and ethylene oxide content 14% by weight
Polyol B: Polyetherol with OH number 250 mg KOH/g and functionality 2.0 based on polyol A (35%), propylene oxide (45%), and dimethylaminopropylamine (20%)
TEOA: Triethanolamine
Isopur SU-12021: Black paste from ISL-Chemie
Jeffcat ZF10: Catalyst from Huntsman
Jeffcat DPA: Catalyst from Huntsman
Additives
V1: Sodium sulfite
V2: Sodium bisulfite
A1: Disodium 2-hydroxy-2-sulfinatoacetate
A2: Sodium hydroxymethanesulfinate
A3: Sodium hydroxymethanesulfonate
A4: Sodium 2-hydroxyethanesulfonate
A5: Disodium 1,2-dihydroxyethane-1,2-disulfonate
A6: Disodium 1,2-dihydroxypentane-1,5-disulfonate
Isocyanate A: Mixture of 85 parts of carbodiimide-modified 4,4'-MDI and 15 parts of polymeric diphenylmethane diisocyanate PMDI with NCO content 27.1

The mixture A was produced by mixing the following components:
92.4 parts by weight of polyol A
3.0 parts by weight of polyol B
1.5 parts by weight of TEOA
0.5 parts by weight of Isopur SA-21050
1.9 parts by weight of water
0.4 part by weight of Jeffcat DPA
0.2 part by weight of Jeffcat ZF10
0.1 part by weight of compounds V1, and V2, and, respectively, A1 to A6 of table 1

The form in which the additives V1, and V2, and also A1 to A6, were used here was that of their aqueous solutions.

The mixture A and the isocyanate component A, and also the additives of table 1, were mixed with one another with an isocyanate index of 100, and charged to a closed mold to give moldings with an average density of 160 g/L.

Formaldehyde was determined by a procedure based on ASTM D5116-06. The size of the chamber was 4.7 liters. The polyurethane samples used were pieces measuring 110 mm×100 mm×25 mm. When molded foams were tested, parts made of the interior of the foam were used. The temperature of the test chamber during the test was 65° C., and the relative humidity was 50%. The air replacement rate was 3.0 liters per hour. The exhaust air stream with volatile aldehydes from the polyurethane was passed through a cartridge with 2,4-dinitrophenylhydrazine-coated silica during 120 minutes. The DNPH cartridge was then eluted with a mixture of acetonitrile and water. The concentration of formaldehyde of the eluate was determined by means of HPLC. The detection limit for formaldehyde emissions for this setup is ≤11 µg/m$^3$.

Table 1: formaldehyde values determined in the chamber for the polyurethane foams obtained without addition of additives (reference), and also with addition of the respective additives A1 or A2 as in the respective concentrations stated in parts by weight based on the total weight of the mixture A.

TABLE 1

|  | Conc. in A | Formaldehyde (µg/m$^3$) |
| --- | --- | --- |
| Reference | — | 792 |
| V1 | 0.10% | 301 |
| V2 | 0.10% | 152 |
| A1 | 0.10% | <11 |
| A2 | 0.10% | <11 |
| A3 | 0.10% | 218 |
| A4 | 0.10% | 285 |
| A5 | 0.10% | 16 |
| A6 | 0.10% | <11 |

The additives V1, V2, and A1 to A6 were mixed at room temperature with the polyols and catalysts described. Phase stability was determined by observing sedimentation behavior. Results are stated in table 2.

TABLE 2

|    | Conc. in A | Sedimentation behavior      |
|----|------------|-----------------------------|
| V1 | 0.10%      | White precipitate after 2 days |
| V2 | 0.10%      | White precipitate after 2 days |
| A1 | 0.10%      | Clear mixture after 3 months |
| A2 | 0.10%      | Clear mixture after 6 weeks |
| A3 | 0.10%      | Clear mixture after 14 days |
| A4 | 0.10%      | Clear mixture after 14 days |
| A5 | 0.10%      | Clear mixture after 7 days* |
| A6 | 0.10%      | Clear mixture after 7 days* |

*A dispersion was then formed

In a further series of experiments, the A components obtained with addition of the additives V1, V2, A1, and A2 were allowed to stand for 7 days at room temperature before reaction with the isocyanate component. The A components were then homogenized by stirring, foam samples were produced as in the experiments of table 1, and formaldehyde emissions of these were determined. The samples relating to the additives V1 and V2 revealed no reduction of formaldehyde emissions. When the additives A1 and A2 were used, a reduction of aldehyde emissions of the foam samples was determined, as in the examples in table 1.

The invention claimed is:

1. A process for the production of polyurethanes, comprising mixing
   - (a) a polyisocyanate,
   - (b) at least one polymeric compound having at least one group reactive toward an isocyanate group,
   - (c) at least one catalyst,
   - (d) from 0.01 to 2% by weight based on the total weight of components (a) to (f) of at least one metal ion salt of a sulfur-carbon sulfinic acid of formula (I):

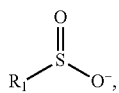

(I)

and,
where $R_1$ is an optionally substituted or unsubstituted aliphatic group having from 2 to 10 carbon atoms, with the proviso that the carbon atom bonded to the sulfur atom is an aliphatic carbon atom, and
   - (e) optionally, a blowing agent,
   - (f) optionally, a chain extender, a crosslinking agent, or a combination thereof, and
   - (g) optionally, at least one auxiliary, at least one additive, or a combination thereof, thereby forming a mixture; and
reacting components of the mixture to obtain a polyurethane.

2. The process according to claim 1, wherein $R_1$ comprises a group reactive toward isocyanate.

3. The process according to claim 1, wherein $R_1$ comprises an acid group, an ester of an acid group or a metal salt of an acid group.

4. The process according to claim 1, wherein the metal ion is selected from the group consisting of an alkali metal, an alkaline earth metal, and a transition metal.

5. The process according to claim 1, wherein the at least one polymeric compound (b) comprises at least one polyetherol.

6. The process according to claim 1, wherein the at least one catalyst (c) comprises at least one incorporable amine catalyst.

7. The process according to claim 6, wherein the at least one incorporable amine catalyst comprises at least one group selected from the group consisting of a primary amine group, a secondary amine group, a hydroxy group, an amide group, and a urea group, and at least one tertiary aliphatic amino group.

8. The process according to claim 6, wherein the at least one incorporable amine catalyst comprises at least one tertiary amino group which bears two moieties selected mutually independently from methyl and ethyl moiety, and also bears another organic moiety.

9. The process according to claim 1, wherein the polyurethane is a polyurethane foam with an average density of from 20 to 850 g/L.

10. The process according to claim 1, wherein the polyurethane is a compact polyurethane with an average density of more than 850 g/L.

11. The process according to claim 10, wherein the polyurethane is cable-sheathing.

12. A polyurethane obtained by the process according to claim 1.

13. A process of making an article, comprising molding a polyurethane according to claim 12 into an article.

14. A process according to claim 13, wherein said article is an interior part of a ship, an aircraft, a truck, a car, or a bus.

* * * * *

UNITED STATES PATENT AND TRADEMARK OFFICE
CERTIFICATE OF CORRECTION

PATENT NO. : 10,316,160 B2
APPLICATION NO. : 15/101183
DATED : June 11, 2019
INVENTOR(S) : Iran Otero Martinez Page 1 of 1

It is certified that error appears in the above-identified patent and that said Letters Patent is hereby corrected as shown below:

In the Specification

In Column 4, Line 39, delete "diisocynate" and insert -- diisocyanate --, therefor.

In Column 7, Line 13, delete "spa-hybridized." and insert -- $sp^3$-hybridized. --, therefor.

In Column 8, Line 13, delete "proove" and insert -- prove --, therefor.

In Column 8, Line 46-47, delete "polisocyanates" and insert -- polyisocyanates --, therefor.

Signed and Sealed this
Third Day of December, 2019

Andrei Iancu
*Director of the United States Patent and Trademark Office*